United States Patent [19]

Twyman

[11] 4,264,060
[45] Apr. 28, 1981

[54] APPARATUS FOR TREATING METALLIC SCRAP IN THE RECOVERY OF METAL THEREFROM

[75] Inventor: Noel H. Twyman, Newport Beach, Calif.

[73] Assignee: Automated Production Systems Corporation, Tustin, Calif.

[21] Appl. No.: 771,846

[22] Filed: Feb. 25, 1977

[51] Int. Cl.³ .............................................. F27B 7/06
[52] U.S. Cl. .................................... 266/87; 266/901; 134/19
[58] Field of Search .................... 75/445, 65 R, 68 R; 134/2, 6, 8, 18, 19, 25 R, 30, 32, 105; 266/87, 901; 432/72

[56] References Cited

U.S. PATENT DOCUMENTS

| | | | |
|---|---|---|---|
| 3,598,649 | 8/1971 | Juhasz | 134/19 X |
| 3,656,735 | 4/1972 | Eliot | 266/901 X |
| 3,794,459 | 2/1974 | Meeon | 432/72 X |
| 3,817,697 | 6/1974 | Parobek | 266/901 X |
| 4,010,003 | 4/1977 | Stauffer | 134/105 X |
| 4,016,935 | 3/1977 | Stephens | 266/901 X |
| 4,032,361 | 6/1977 | Eriksson et al. | 134/38 X |

OTHER PUBLICATIONS

Corono Plant Dryer System-9/12/73.

*Primary Examiner*—Paul A. Bell
*Attorney, Agent, or Firm*—Edward D. O'Brian; K. H. Boswell

[57] ABSTRACT

Metal scrap such as aluminum scrap can be economically processed so as to recover the metal in the scrap by concurrently passing the scrap through a rotary kiln together with a recycled stream of hot gas. The heated scrap is separated from the gas stream at the discharge end of the kiln and is fed to a melter used to recover the metal. The separated gas stream is burned in an appropriate burner or incinerator used to provide the recycled gas stream.

22 Claims, 2 Drawing Figures

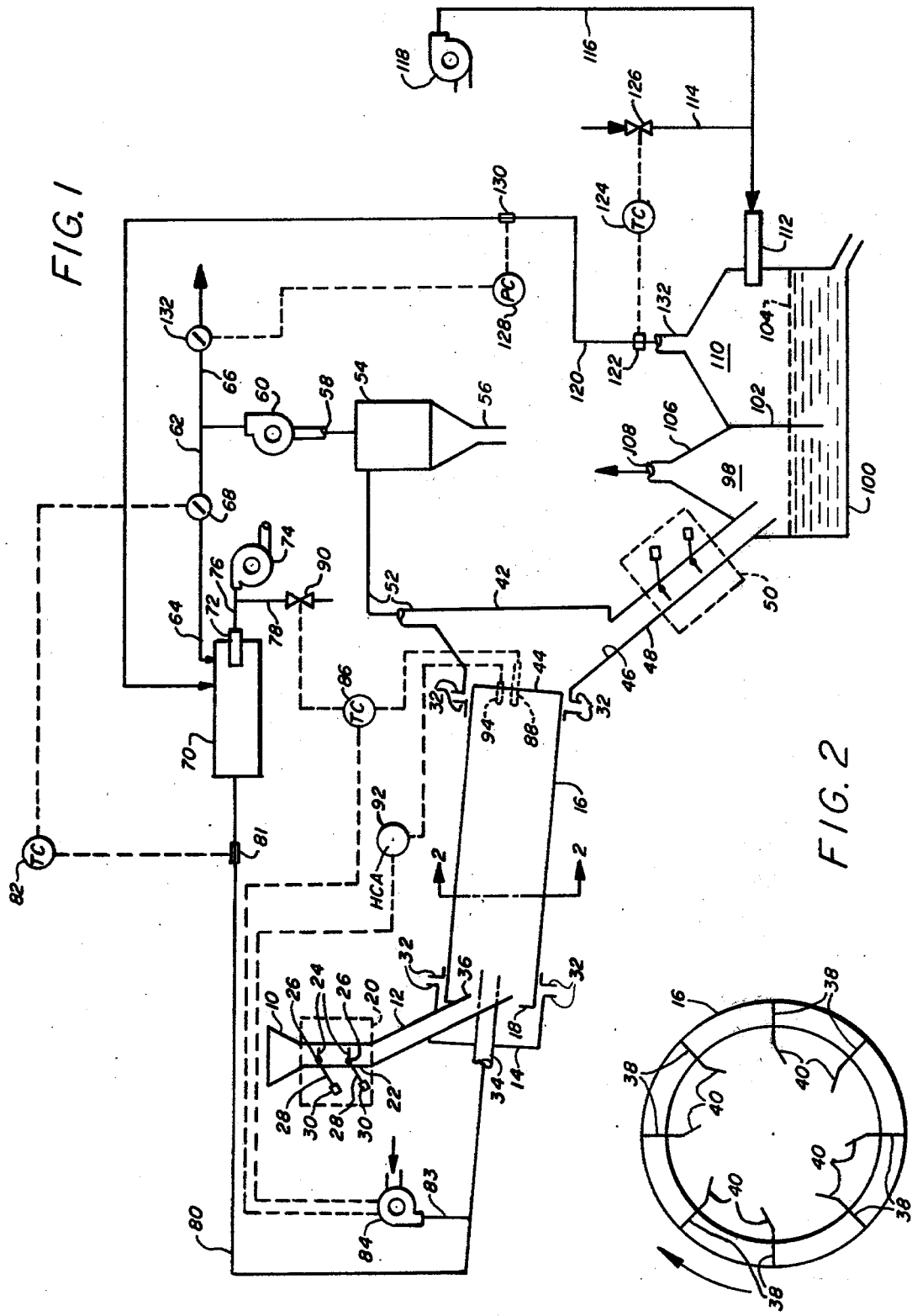

APPARATUS FOR TREATING METALLIC SCRAP IN THE RECOVERY OF METAL THEREFROM

CROSS-REFERENCE TO RELATED APPLICATIONS

The subject matter of this application is related to the subject matter of the abandoned Noel H. Twyman U.S. patent application Ser. No. 570,183, filed Apr. 21, 1975, entitled "METAL MELTING METHOD AND APPARATUS".

In the interest of brevity the entire disclosure of this application is incorporated herein by reference.

BACKGROUND OF THE INVENTION

The invention set forth in this specification pertains to both methods and apparatuses for processing metal scrap so as to recover the metal in such scrap. Both of the methods and apparatuses indicated in this specification are considered to be particularly adapted for use in connection with the recovery of various metals and alloys from various other types of scrap.

It is believed it is well recognized that it is desirable to process aluminum scrap so as to recover the metal aluminum so that this metal can be reutilized. Scrap aluminum is normally contaminated with two different types of contaminants—organic contaminants and inorganic contaminants. The organic contaminants most commonly consist of remnants of various types of oils, remnants of various types of coatings or paints and the like. The latter may or may not contain significant amounts of inorganic pigments. The inorganic contaminants present may include dust particles, pigments as indicated in the preceding, some minor amounts of various scrap metals (other than the principal metal within the scrap) and the like. Aluminum scrap will also normally contain varying amounts of aluminum oxide resulting from the oxidation of the aluminum scrap and/or from appropriate anodizing procedures employed in processing the metal from which the scrap originated.

Both the organic and inorganic contaminants as indicated in the preceding are preferably removed to as great a degree as possible from the scrap prior to the scrap being melted down in an appropriate furnace or melter in order to avoid interference with the operation of the furnace or melter and in order to minimize to as great a degree as reasonably possible the chances of the molten metal obtained from the furnace or melter being contaminated. It has been recognized that an effective manner of getting rid of the organic contaminants present on a scrap metal such as scrap aluminum is to heat the scrap aluminum to a sufficient temperature so that substantially all of the organic contaminants will decompose and so that the resulting decomposition products will substantially all vaporize.

It has also been recognized preferably such scrap should be heated at a temperature which is sufficiently low as to minimize oxidation of the aluminum and at a temperature which is sufficiently low so that there is no reasonable chance of the aluminum scrap tending to agglomerate or fuse into a body which is difficult to handle or which has to be broken up. Further, it has been recognized that the amount of time that the scrap is heated should be controlled so that the scrap is heated no longer than is reasonably necessary to decompose the organic contaminants and is not held at an elevated temperature sufficient to accomplish such decomposition for a sufficient period for agglomeration of the aluminum particles to take place.

Although a wide variety of different separation techniques based upon difference in various physical properties have been capable of being used to recover inorganic contaminants from metal scrap such as aluminum scrap, it normally has not been economic to utilize such procedures. In the recovery of aluminum from aluminum scrap various inorganic contaminants of an oxide character have normally been separated in a furnace or melter as indicated. The majority of such contaminants will float to the top of a bath of molten aluminum to form slag or slag-like skin of inorganic contaminants on the molten metal which can be skimmed off of the metal in accordance with well established techniques. However, excessive slag formation during the recovery of metal such as aluminum is disadvantageous because of the labor costs in removing the slag and the fact that some of the molten metal is normally removed from a furnace along with the slag.

Several different procedures have been proposed and to various extents adopted for the removal of organic contaminants from scrap such as aluminum scrap. One method has involved heating a bed or body of scrap either directly or indirectly to a point where the various organic contaminants vaporize so that they can be ignited. Other procedures have involved conveying a bed of aluminum through a heated chamber while either hot gas is circulated through the bed or while a flame is directed toward the moving bed of scrap.

All of these procedures are considered to be disadvantageous for any one of a variety of different reasons. Whenever a flame is directed at a bed of aluminum scrap there is a significant probability of at least some of the aluminum being oxidized. Of course any such oxidation results in a lowering of the amount of aluminum metal recovered. Further, the heating of aluminum scrap is relatively difficult to control because the quantity of organic contamination of such scrap may vary significantly. There have been instances where the procedures employed for removing organic contaminants have been relatively unsafe as a result of explosion hazards caused by the presence of significant quantities of organic material in air.

It is considered that the economic desirability of recovering metal from metal scrap coupled with the limitations of the processes as are indicated in the preceding have stimulated interest in improved manners of recovering metal from scrap. Such current work as has been done in this field has tended to recognize that improvement in metal recovery from scrap has required a complete "system" in which individual operations are interrelated.

As an illustration of this it has recently been recognized that aluminum can be recovered from aluminum scrap by using a process in which aluminum scrap is fed into the upper inlet end of a rotary kiln located so that the discharge end of the kiln discharges the scrap directly into a melting furnace. In this process the kiln and the furnace are connected by appropriate conduits or ducting containing a burner and a blower so that there is a continuous gas flow through the furnace and then through the kiln. This flow is counter-current to the direction of scrap flow in the kiln. The burner serves to maintain the temperature of the recycled gas to a desired valve. With this type of system some of the recycled gas is bled off from the system through a vent in the furnace so it can be discharged to the atmosphere.

This separated gas may be passed through a recuperator so as to preheat either air supplied to the burner to sustain combustion or the fuel burned in the burner or both.

While this type of process is considered to be advantageous as compared to prior procedures it is considered to be disadvantageous for several reasons. The rotary kiln used with this procedure is essentially operated in a conventional manner so as to heat the scrap passing through it by the counter-current flowing gas stream. This is not considered to tend to effect any significant removal of inorganic contaminants in the scrap and, further, if there is any removal of inorganic contaminants from the scrap it is considered this procedure will only convey such inorganic contaminants back to the furnace where they will tend to settle out so as to form a slag or skin on the molten metal within the furnace. Further, because of the counter-current flow within the rotary kiln and the relationship of the kiln to the furnace the temperature of the scrap discharged to the furnace will be related to the temperature within the furnace. As a consequence of this it is considered that it is impossible to obtain the degree of temperature control in the furnace necessary for most effective removal of organic material from the scrap.

As a result of the limitations of prior processes for treating metal scrap it is considered there is a need for improving the economics of such treatment. It is particularly considered that there is a need to improve upon the treatment of metal scrap so as to effectively utilize heat which is essentially waste heat in prior related processes. It is also considered there is a need for an improved method of and an improved equipment for treating metal scrap such as aluminum metal scrap in such a manner as to maximize the recovery of metal from such scrap utilizing a minimum amount of fuel and labor.

SUMMARY OF THE INVENTION

A broad object of the present invention is to fulfill needs as indicated in the preceding paragraph. Thus, an object of the invention is to provide new and improved processes for processing metal scrap such as aluminum scrap of an economically desirable character. A related object of the invention is to provide new and improved apparatuses for the same purpose. Because of the nature of the invention it is not considered necessary to encumber this specification with a long list of further detailed objectives of the invention. Further objects and advantages of this invention will be apparent to those skilled in the art of scrap metal treatment from a detailed consideration of this entire specification and the appended claims.

The invention itself recognizes that an important or critical aspect of treating metallic scrap in the recovery of metal from such scrap involves the process comprising passing the scrap through the upper inlet end of a rotary kiln while rotating the kiln so that the scrap is cascaded through the interior of the kiln as it is simultaneously moved through the kiln to the lower discharge end of the kiln, concurrently passing a gas stream at a temperature sufficient to cause decomposition and vaporization of organic material in the scrap through the kiln from the upper end to the lower end of the kiln so the gas stream contacts the scrap as it is cascaded through the interior of the kiln, and then separating the gas stream from the scrap at the discharge end of the kiln as the scrap is discharged from the kiln.

In accordance with the invention, preferably the heated scrap is then directly passed to the melting furance under such conditions that the gas stream from the kiln is isolated from the atmosphere above the melting furnace. This gas stream from the kiln is preferably passed through a dust collector to remove entrained inorganic materials from it and then is burned in an incinerator used to supply the hot gas stream introduced into the inlet end of the kiln. The incinerator may also be used to burn or incinerate gas from the melting furnace or melter.

In accordance with this invention it is preferred to control the operation of a complete system employing the various parts indicated in the preceding and other parts as subsequently indicated through the use of appropriate control devices as hereinafter discussed so that there is very precise control of the conditions under which the kiln is operated so that the scrap separated is conveyed to the melting furnace at a carefully controlled temperature without any significant heat loss occurring as a result of cooling of the scrap. The controls utilized regulate the operation of the kiln in order to achieve this result in such a manner that the conditions within the kiln are substantially uniform at all times, even when there is significant variation in the quantity and/or character of the scrap being treated in accordance with the invention.

Because of the nature of the invention the practice of the process of the invention and the construction of an apparatus in accordance with the invention are both somewhat more involved than the preceding summary indicates. Preferably the invention is utilized in conjunction with various "auxiliary" pieces of equipment not indicated in the preceding so as to be as economic as reasonably possible and so as to provide gases discharged to the atmosphere which are reasonably "clean" in the sense that they contain a minimum amount of contaminants.

BRIEF DESCRIPTION OF THE DRAWINGS

Because of the nature of the invention it is best more fully described with reference to the accompanying drawings in which:

FIG. 1 is a schematic flow diagram indicating one manner of utilizing the present invention; and FIG. 2 is a diagrammatic cross-sectional view corresponding to a view taken at line 2—2 of FIG. 1 illustrating the manner in which a rotary kiln is preferably constructed so as to be utilized with the invention.

It will of course be obvious that the flow diagrams indicated in the drawing indicate manners in which apparatuses in accordance with the invention can be constructed and indicate manners in which the invention can be practiced. The invention set forth herein embodies what may be considered as essentially intangible concepts which are set forth and defined in the appended claims. It is considered that these concepts can be easily utilized by those skilled in the field of scrap metal treatment in a number of different ways so as to achieve benefits in accordance with the present invention.

DETAILED DESCRIPTION

In the manner of practicing the invention indicated in FIG. 1 particles of metal scrap such as aluminum scrap (not shown) of any convenient, easily handled size are fed from a hopper 10 through a short, downwardly directed inlet chute 12 in a hood 14 into the interior of a rotary kiln 16 adjacent to the upper inlet end 18 of this kiln 16. In order to control the kiln 16 so that it operates properly and in order to prevent possible atmospheric contamination it is preferred to locate within the chute 12 an inlet airlock 20.

Although various different types of airlocks can be utilized in practicing the invention it is considered preferable to utilize as the airlock 20 two separate flapper type gate valves 22 located so as to be separated from one another along the chute 12 a sufficient distance so that comparatively small batches or quantities of scrap metal can be fed to the kiln 16 from the hopper 10 at any one time without both of the valves 22 being opened at the same time. The use of flapper type gate valves 22 is considered preferable because such valves can conveniently handle metal scrap in which the particles are of a wide variety of diverse sizes and shapes without jamming.

The valves 22 employed are preferably identically constructed so as to each include a flapper 24 capable of closing off the interior of the chute 12 pivotally mounted on a pivot 26 so as to be capable of being moved from a normal closed position closing off the chute 12 to an open position in which the flapper 24 extends generally along the interior of the chute 12 downwardly from its pivot 26. Each flapper 24 is preferably connected to an externally located arm 28 carrying a counterweight 30 for the purpose of normally biasing it to a closed position.

In many applications it is considered that it will be preferable to mechanically couple the two valves 22 together so that they will not both be opened at the same time. Further, it is considered that normally both of the valves 22 should be mechanically coupled so that they will be sequentially opened and closed.

The hood 14 is essentially an enclosure designed to isolate the interior of the kiln 16 from the ambient atmosphere. Although it is possible to construct an apparatus to utilize the present invention in such a manner that the hood 14 merely fits closely around and adjacent to the upper end 18 of the kiln 16 it is preferred to utilize conventional rotary air seals 32 in order to connect the hood 14 to the upper end 18 of the kiln 16 in order to effectively isolate the interior of the kiln 16 and the hood 14 from the ambient.

This hood 14 is constructed so as to include an inlet hot gas conduit 34 which leads through the hood 14 into the interior of the kiln 16 adjacent to the upper end 18 of the kiln 16. It will be noted that this conduit 34 is indicated in the drawing as being located slightly above and at one side of the bottom 36 of the chute 12. By virtue of this construction there is no danger of scrap conveyed through the chute 12 piling up or accumulating so as to impede the flow of hot gas through the conduit 34 in the interior of the kiln 16.

Although this kiln 16 may be a conventional kiln it is preferred to construct the kiln 16 as indicated hereinafter. The reasons for this pertain to the "wear" characteristics of such a kiln and to the manner in which the kiln 16 is used in accordance with this invention in order to transfer heat and to significantly remove dust and other comparatively small particles of inorganic material from the scrap fed to the kiln 16. Such removal is the result of entrainment of such inorganic particles in the hot gas stream moving through the kiln 16. Many of such particles will be unattached to the particles of metal scrap fed to the kiln 16. In addition, however, many of such particles will tend to be knocked off of the particles of scrap as the result of the manner in which the scrap itself moves within the kiln 16.

In the preferred manner of carrying out the invention the kiln 16 is used so as to lift and elevate the particles of scrap from the area of the rotary kiln commonly referred to as the "toe" or "bed" of the kiln and to cascade such particles of scrap so that they fall throughout the interior of the kiln to as great an extent as reasonably possible. Although a conventional kiln can be operated so as to cascade a load throughout the interior of the kiln by rotating the kiln above the so-called "critical speed"—the speed at which the load tends to cascade across the interior of the air space within the kiln—it is considered that it would be against conventional practice to operate a kiln in this manner.

In cement and other industries where rotary kilns are commonly used it is considered that most effective heat transfer takes place within a rotary kiln with a minimum of dust loss by rotating the kiln below its critical speed so that the load within the kiln merely "churns" as heat is transferred to it from both the gas stream within the kiln and the lining of the kiln. With the present invention such dust loss from the load within the kiln to the air stream passing through the kiln is preferably maximized by continuously exposing as much of the surface area of the load within the kiln as possible to the gas stream passing through the kiln.

With a conventional kiln such maximization can be achieved by operating the kiln above its critical speed. However, such maximization of dust entrainment within the gas stream passing through the kiln 16 can be achieved by locating around the interior of the kiln 16 a plurality of periodically spaced lifters 38 having upturned ends 40 as indicated in FIG. 2 of the drawing. These ends 40 are angled with respect to the remainders of the lifters 38 in order that scrap particles elevated by the lifters 38 as the kiln 16 is turned will fall off the lifters 38 in such a manner as to be spread out so as to fall the maximum extent reasonably possible across the interior of the kiln 16.

Such movement of scrap metal particles in the kiln 16 not only exposes dust entrained with such particles so that such dust can be picked up and carried by the gas flowing through the kiln. In addition such movement of particles within the kiln tends to abraid the particles as they hit against one another and as they collide with the kiln 16 after they have cascaded through the interior of the kiln. This has the tendency to shake or jar loose any inorganic material adhered to the metal particles being treated within the kiln so that such adhered particles can be effectively removed by being carried through the gas stream moving through the kiln 16. This same physical action is also considered to facilitate the decomposition of organic materials because it tends to break up or crack coatings or the like so as to increase the exposed surface areas of such materials as much as reasonably possible. On occasion some organic materials may be even physically jarred loose from the scrap upon which they are located.

Further, the cascading type action achieved in the kiln 16 is advantageous inasmuch as it continuously exposes the surfaces of the metal particles within the kiln 16 to as much of the hot gas stream as reasonably possible. This enables the hot gas stream to effectively transfer heat to such metal particles. It also directly exposes any organic contaminants or such metal particles to the hot gas stream under conditions favorable to both the vaporization of organic materials and to the removal of decomposition products resulting from the decomposition of such organics.

What is referred to herein as a separator 42 is located at the lower discharge end 44 of the kiln 16 so as receive both the metal particles passing through this kiln 16 and the gas stream from within the kiln 16 and to separate these particles from this stream by the action of gravity. Preferably in order to prevent gas loss other conventional air seals 32 are located between the separator 42 and the lower end 44. It is considered, however, that it is possible to have the fit between the lower end 44 and the separator 42 sufficiently close so that a usable apparatus can be constructed without utilizing the seals 32 noted.

Although this separator 42 is termed a "separator" because of its function it is essentially an enlarged hood having a sloping bottom 46 which leads to a downwardly directed discharge chute 48 through which the particles accumulating on the bottom 46 can be moved by gravity. The chute 48 preferably contains a discharge airlock 50 corresponding to the airlock 20 previously described for the purpose of minimizing any gas escaping from the interior of the separator 42 through the chute 48. Since the parts of the airlocks 20 and 50 correspond to one another, the parts of the airlocks 50 are indicated in the drawing by the numerals previously used in describing the airlock 20.

This airlock 50 has the effect of causing any gas separated by gravity from the metal particles in the separator 42 to move in a more or less "natural" manner upwardly into a conduit or line 52 leading to a dust collector 54. This collector 54 serves to remove from the gas passing from the kiln 16 any entrained inorganic material so that such material will not be recirculated or vented to the atmosphere. Such a collector 54 is preferably of a conventional construction and includes a bottom dust discharge chute 56 and a gas outlet (not separately numbered) connected to a further line 58 containing a draft fan 60 assisting in obtaining the desired gas flow in the system.

This line 60 leads to a Tee connection 62 which places the line 60 in communication with further lines or conduits 64 and 66. The conduit 64 contains a conventional damper-type flow regulator or valve such as is commonly referred to as a damper 68. This damper 68 is of a conventional construction and may be operated as hereinafter more specifically indicated so as to regulate the amount of gas passing from the separator 42 which is recycled in the system and the amount of gas which may be discharged from the system. That gas which is recycled passes through the line 64 to a conventional combustor or incinerator 70 while that gas which is discharged from the system passes through the line 66.

The gas passing through the line 66 may be directly vented to the atmosphere through a conventional stack (not shown). Preferably, however, it is passed through an incinerator (not shown) corresponding to the incinerator 70 so as to remove organic contaminants prior to being vented to the atmosphere. The discharge from any incinerator used to burn any combustibles in the gas passing through the line 66 can be regarded as an important heat source which can be utilized in various known manners such as, for example, to preheat fuel and/or air supplied to any burner or incinerator as herein described.

In the incinerator 70 gas passing from the line 64 is contacted by the flame from a conventional burner 72 so as to cause combustion of any combustible material present within this gas. This is considered desirable in minimizing the hydrocarbon concentration of the recycled gas used in accordance with the invention so as to minimize any chances of a hazard resulting from the operation of the kiln 16. The burner 72 is supplied with combustion air by a fan 74 connected to a line 76 leading from the fan 74 to the burner 72. Fuel is supplied to the line 76 through a further line 78 in a conventional manner.

A line or conduit 80 leads from the incinerator 70 to the conduit 34 previously described for the purpose of conveying hot gas into the interior of the kiln 16. A conventional temperature sensing element 81 is preferably located within this line 80 adjacent to the incinerator 70. This temperature sensing element 81 is connected to a conventional temperature control device 82 which in turn is connected in a conventional manner to the damper 68 so as to regulate the operation of the damper 68 in accordance with the temperature of the hot gas from the incinerator 70.

The damper 68 is continuously opened or closed to various extents so as to permit the recycling of gas from the kiln 16 as reasonably necessary in order to maintain a substantially constant temperature of the gas circulated through the line 80 back to the kiln 16. A further line 83 is connected into the line 80 adjacent to the conduit 34 so that diluting air may be added to the gas flow through the line 80 should this be necessary or desirable in utilizing the invention. A blower or fan 84 is connected to the line 83 for the purpose of supplying such air.

Another conventional temperature control device 86 is preferably mounted on or adjacent to the separator 42. This device 86 is connected to a temperature sensing element 88 extending into the separator 42 in such a manner as to be capable of sensing the temperature of the hot gas stream emitted or discharged from the lower end 44 of the kiln 16. This sensing element 88 should be spaced from the interior of the kiln 16 a sufficient distance so that there is no significant chance or danger of it being contacted by the metal particles which are cascaded through the interior of the kiln 16. It should, however, be sufficiently close to where such particles are present adjacent to the lower end 44 of the kiln 16 so as to be capable of accurately sensing the temperature of the hot gas stream as such stream "leaves" or is separated from such particles.

In the normal manner of carrying out the present invention the temperature of the gas stream in this area will closely approximate the temperature of the metal particles as such particles are deposited on the bottom 46 of the separator 42. It is considered important that the invention be carried out so that the progress of metal particles through the kiln 16 will be correlated with the gas flow through the kiln 16 so that both the temperature of the gas and the temperature of the particles are substantially identical at the lower end 44 of the kiln 16. This correlation can be accomplished through appropriate regulation of the speed of rotation of the kiln 16 and its slope and/or by variation in the quantity of gases passing through the kiln 16.

It is considered that the temperature of metal particles in the kiln 16 should reach the temperature of the hot gas stream at about or shortly before the metal particles reach the discharge end 44 of the kiln 16 in order to avoid unnecessary heating of the metal particles and in order to minimize the size of the equipment required. The temperatures of the hot gas stream and the metal particles discharged from the kiln 16 should preferably approximate the temperature at which all organic material present on the scrap treated will be decomposed so that substantially no organic materials remain.

As a result of experience it has been found that this temperature is approximately within the range of from 900° F. to 1000° F. When the scrap particles treated in accordance with this invention are aluminum particles or are particles of a metal or alloy having a lower melting or fusing point than aluminum it is considered that the temperature of both the discharged metal particles and the hot gas stream should be no greater than about 1000° F. in order to minimize to as great an extent as reasonably possible the oxidation of the metal within the scrap and in order to minimize the possibility of the metal tending to soften and agglomerate. Normally the movement of metal particles within the kiln will be such as to effectively tend to prevent the latter. However, within the separator 42 and the chute 48 such particles will not move in the manner in which they are moved in the kiln 16 and may, if sufficiently hot, tend to stick together, even though there is some movement of such particles along the bottom 46 of the separator 42 and within the chute 48.

The temperature control device 86 is utilized with the present invention in order to regulate the amount of fuel supplied to the burner 72 through the line 78. This function is accomplished by connecting the control device 86 to a conventional remote control valve 90 in the line 78 in a conventional manner. The operation of the valve 90 is controlled with the device 86 so that the amount of fuel burned in the incinerator 70 is such as to maintain the temperature of the exit gas from the kiln 16 substantially constant.

A so-called "combustibles" or hydrocarbon analyzer control device 92 is preferably employed for the purpose of analyzing the gas at the discharge end 44 of the kiln 16 as the kiln 16 is operated. This device 92 is connected in a conventional manner to a conventional sensing element 94 located closely adjacent to the element 88. At this time it is preferred that the sensing element 94 consist of a sampling tube connected to the device 92 so as to continuously convey gas from the interior of the kiln to it. As the gas is so conveyed it may be cooled by ambient conditions to a temperature at which the device 92 operates effectively. If through the operation of the sensing element 94 the analyzer-control device 92 detects the presence of any significant quantity or proportion of unconsumed or unburned hydrocarbons the control device 92 actuates the fan 84.

This causes the fan 84 to operate to supply ambient air which enters the kiln 16 through the conduit 34. Such ambient air operates to cool the hot gas mixture recycled to the kiln through the line 80 and therefore serves to lower the internal temperature within the kiln 16. To a degree this is considered to be beneficial in tending to lower the reactivities of any unconsumed or unburned hydrocarbons present within the kiln and in the gas mixture passing from the kiln. It is considered more important, however, that the air supplied as a result of the operation of the fan 84 will tend to dilute the concentration of unconsumed or unburned organic material in the gas which is discharged or passes from the kiln 16. This is considered to be important in preventing the concentration of such unburned or unconsumed hydrocarbon from reaching a point such as to present a possible explosion or similar hazard.

All of the apparatus described up to this point of this specification can be utilized as a complete separate unit or "system" so as to discharge heated scrap metal particles such as aluminum particles through the chute 48 for storage and subsequent melting in a conventional melting furnace or melter of any type. Preferably, however, the heated scrap particles are discharged from the chute 48 directly into a well 98 located at one side of a known type of melting furnace or melter 100 constructed in accordance with conventional practice so as to include a dividing wall 102 extending downwardly into a bath 104 of molten metal.

A small hood 106 preferably encloses the well 98 in such a manner that it is vented to the atmosphere through a stack 108. Normally there will be no necessity for burning any gases passing through the stack 108 to avoid pollution because of the action occurring within the kiln 16 tending to remove any volatile materials from the scrap fed to the well 98. Further, normally there will be so little gas moving through the stack 108 that it will not be particularly significant to recover heat values from such gas. Any inorganic contaminants on the scrap fed to the melter 100 will tend to accumulate within the well 98 on top of the metal 104 in such a manner that they can be conveniently removed in a conventional manner with a minimum of difficulty.

The furnace 100 includes a heating chamber 110 located to one side of the wall 102 which is adapted to be heated by a conventional burner 112. This burner 112 is supplied with fuel through a line 114 and with air through a line 116 connected to a conventional blower or fan 118. The products of combustion from the burner 112 are taken out of the chamber 110 through a line 120 and are conveyed back to the incinerator 70 for two purposes. If for any reason unburned hydrocarbons are present in the gas taken out of the chamber 110 these are consumed in the incinerator 70. Further, the gases taken from the chamber 110 represent an important source of hot gas which is utilized within the kiln 16.

It is preferred to utilize a sensing element 122 corresponding to the sensing element 88 in the line or conduit 120 adjacent to the chamber 110 for the purpose of sensing the temperature of the exit gas from the chamber 110. This element 122 is connected to a conventional temperature control device 124 corresponding to the device 86 previously described. This device 124 is preferably coupled to a valve 126 in the line 114 for the purpose of controlling the fuel flow to the burner 112 so that the temperature in the chamber 110 will be substantially constant.

When the furnace 100 is used it is preferred to connect the temperature control device 86 to the fan 84 so that both it and the analyzer 92 may be utilized to control the operation of this fan 84. The use of the control devices 86 to control the operation of the fan 84 is particularly desirable in situations when the complete "system" described is not being operated in what may be regarded as a normal manner. Thus, this use of the control device to control the operation of the fan 84 is useful in preventing overheating of the kiln 16 and/or various parts in proximity to the kiln 16 when the load of scrap metal within the kiln 16 is significantly dimensioned and/or is not present. The fan 84 operates to prevent such overheating by serving to supply the kiln 16 with air at about ambient temperatures and this in turn prevents the hot gas supplied to the line 80 from heating the kiln 16 and associated parts when such hot gas cannot be utilized to heat scrap or a normal quantity of scrap.

Normally the furnace 100 will be constructed in such a manner that the chamber 110 is far from being air tight. In order to prevent the loss of hot gas from within the chamber 110 and also to prevent the leakage of cool, ambient air into the chamber 110 it is considered desirable to utilize a pressure control device 128 in connection with the line 120 from the furnace 100. This device 128 is coupled to a sensing element 130 located in this line 120 and is utilized to control a flapper-type valve or damper 132 in the line 62. This pressure control device 128 serves to regulate the damper 132 in such a manner as to create a back pressure such that the remainder of the apparatus described in connection with the movement of gas is operated in such a manner that the chamber 110 and the furnace 100 is maintained at substantially atmospheric pressure.

This of course prevents the escape of gas to the ambient from the furnace 100. The damper 132 is thus a pressure balancing device which serves to divert flow so that the desired pressure relationships are maintained so that there is no gas flow other than from the burner 112 into or out of the chamber 110. This damper 132 thus serves a different function than the damper 68. The damper 68 is used to divide the flow through the conduit 58 in accordance with the temperature of the gas from the incinerator 70 so as to maintain a proper or desired temperature of the gas supplied to the kiln 16 except, of course, when the fan 84 is being operated for dilution purposes.

The entire "system" described in the preceding is considered to be quite advantageous in providing for the economic recovery of a metal such as aluminum from scrap. By virtue of the manner in which this "system" operates it is considered to be quite efficient from a heat utilization standpoint. The heat from the furnace or melter 100 is not wasted in accordance with this invention but instead is utilized for the purpose of heating metal scrap to an elevated temperature. It is also utilized for the purpose of decomposing various organic materials so as to remove such materials from the scrap in order to facilitate the processing of the scrap in the melter.

Because the scrap which has been heated to remove organic materials is supplied to a melter before it has had a chance to significantly cool heat savings are achieved over processes in which scrap is heated to remove organic material, is cooled and is then reheated as it is supplied to a melter. These results are concurrently achieved along with the removal of inorganic dust-like particles from the scrap as it is being heated by utilizing the hot gas stream employed for heating purposes as a carrier to carry such particles away from the scrap where they can be separated in a separate dust collector 54.

Further, the manner in which the kiln 16 operates is beneficial because the kiln operation tends to promote the removal of such dust-like particles from the metal scrap processed and tends to promote the decomposition of organic material present upon the scrap being treated. These various interrelated effects are achieved concurrently with adequate control of the process conditions so as to prevent the agglomeration of the scrap and so as to minimize any tendency of the scrap metal in the kiln 16 being oxidized.

The invention contemplates the use of the fan 84 so as to control the concentration level of vaporized organic material so that such concentration is sufficiently low so as to present any hazard. During normal utilization of the kiln 16 the organic or hydrocarbon concentration will never be sufficiently high that there is significant danger of organic materials burning within the kiln 16 and/or that a gas mixture will be formed in the kiln 16 which is of a hazardous or explosive character. Normally the concentration level of unconsumed or unburned hydrocarbons which will cause actuation of the analyzer 92 will be set in accordance with appropriate governmental or insurance company regulations. Such agencies or organizations consider different hydrocarbon concentrations acceptable as not providing an explosion hazard.

I claim:

1. An apparatus for use in treating metallic scrap which comprises:

rotary kiln means for use in contacting metallic scrap with a recycled flame-free hot gas stream consisting essentially of gas which is passed through said kiln and which has been incinerated and diluent air, said rotary kiln means having in inlet and a discharge end, said hot gas stream flowing through said kiln means from said inlet end to said outlet end, hood means for isolating said inlet end from the ambient atmosphere, separating means for isolating said discharge end from the ambient atmosphere and for separating scrap particles discharged from said kiln means from hot gas passing through said kiln means, feed means for introducing scrap metal particles into the inlet end of said kiln means through said hood means, inlet conduit means for introducing said hot gas stream into said inlet end of said kiln means through said hood means, discharge means for removing metal particles from said separating means, heat supply means for supplying said hot gas stream to said inlet conduit means, said heat supply means consisting essentially of an incinerator, other conduit means for conveying hot gas from said separating means to said incinerator, further conduit means for conveying hot gas from said incinerator to said inlet conduit means and means for supplying diluent air for temperature control purposes, temperature control means for controlling the temperature of the hot gas stream at the outlet end of said rotary kiln means substantially constant, said temperature control means including temperature monitoring means at said outlet end of said rotary kiln means, said temperature monitoring means measuring the temperature of the hot gas stream at the outlet end of said rotary kiln means, said temperature control means connected to said heat supply means so as to regulate the temperature and flow rate of said hot gas stream introduced into said kiln means, airlock means for isolating at least one of said inlet or said outlet ends of said rotary kiln means from the ambient atmosphere, and including control means for operating said incinerator so that additional heated gas is added to said recycled hot gas to maintain the temperature of heated gas passing through said outlet end of said kiln substantially constant.

2. An apparatus as claimed in claim 1 including:
dust collector means in said other conduit means for removing dust particles carried by said conveyed hot gas.

3. An apparatus as claimed in claim 2 including:
fan means in said other conduit means.

4. An apparatus as claimed in claim 2 wherein:
said airlock means comprises two separate flapper valves spaced from one another along the length of the feed chute, and
said rotary kiln means includes internal lifter means for cascading said scrap through the interior of said rotary kiln means during the rotation of said rotary kiln means.

5. An apparatus for use in treating metallic scrap which comprises:
rotary kiln means for use in contacting metallic scrap with a hot gas stream, said rotary kiln means having an inlet and a discharge end,
hood means for isolating said inlet end from the ambient atmosphere,
separating means for isolating said discharge end from the ambient atmosphere and for separating scrap particles discharged from said kiln means from hot gas passing through said kiln means,
feed means including an airlock for introducing scrap metal particles into the inlet end of said kiln means through said hood means,
inlet conduit means for introducing a hot gas into said inlet end of said kiln means through said hood means,
discharge means including an airlock for removing metal particles from said separating means, and
other conduit means for recycling heated gas separated by said separating means to said inlet conduit means,
melter means for melting scrap located so as to receive heated metal particles from said discharge means,
burner means for heating said melter means,
further conduit means for conveying heated gas from said melter means to said other conduit means so that heated gas from said melter means is added to the recycled heated gas moving through said other conduit means,
fan means located in said other conduit means for promoting the circulation of said recycled heated gas,
incinerator means located within said other conduit means for heating recycled heated gas,
pressure control means for controlling the pressure in said other conduit means so that no ambient air will flow into or out of said burner means.

6. An apparatus as claimed in claim 5 including:
temperature control means for maintaining the temperature of the hot gas separated by separating means substantially constant, said temperature control means being connected to said incinerator means so as to regulate the temperature of said hot gas separated by said separator means substantially constant by controlling the operation of said incinerator means.

7. An apparatus as claimed in claim 6 including:
dilution fan means for supplying ambient air into said inlet conduit means, said dilution fan being connected to said temperature control means so as to be operated thereby.

8. An apparatus as claimed in claim 5 including:
inlet conduit temperature control means for venting said other conduit means to the atmosphere so as to control the proportion of hot gas separated by said separating means passed to said incinerator means and recycled to said inlet conduit means.

9. An apparatus for use in treating metallic scrap which comprises:
rotary kiln means for use in contacting metallic scrap with a flame-free hot gas stream consisting essentially of gas which is passed through said kiln and which has been incinerated and diluent air flowing through the interior of said rotary kiln means, said rotary kiln means having an inlet end and an outlet end, said hot gas stream flowing through said rotary kiln means from said inlet end to said outlet end,
closure means for isolating said inlet end from the ambient atmosphere,
separator means for isolating said discharge end from the ambient atmosphere and for separating scrap particles discharged from said kiln means,
inlet conduit means for introducing said hot gas stream into said inlet end of said kiln means,
heat supply means external to said rotary kiln means for supplying said hot gas stream to said inlet conduit means,
said heat supply means consisting essentially of an incinerator, other conduit means for conveying hot gas from said separating means to said incinerator, further conduit means for conveying hot gas from said incinerator to said inlet conduit means and means for supplying diluent air for temperature control purposes,
temperature control means for controlling the temperature of the hot gas stream at the outlet end of said rotary kiln means substantially constant, said temperature control means including temperature monitoring means at said outlet end of said rotary kiln means, said temperature monitoring means measuring the temperature of the hot gas stream at the outlet end of said rotary kiln means, said temperature control means connected to said heat supply means so as to regulate the temperature and flow rate in said hot gas stream introduced into said kiln means,
feed means for introducing scrap metal particles into the inlet end of said kiln means,
discharge means for removing metal particles from said separator means,
airlock means for isolating at least one of said inlet or said outlet ends of said rotary kiln means from the ambient atmosphere;
and including,
dust collector means in said other conduit means for removing dust particles carried by said conveyed hot gas,
melter means for melting scrap located so as to receive heated metal particles from said discharge means;
burner means for heating said melter means; and
said heat supply means includes conduit means for conveying heated gas from said melter means to said inlet conduit means so that heated gas from said melter means is supplied to said gas stream introduced into said kiln means.

10. An apparatus as claimed in claim 9 wherein:
said feed means includes a feed chute, and
said airlock means includes two separate flapper valves spaced from one another along the length of said feed chute.

11. An apparatus as claimed in claim 9 wherein:
said airlock means includes two separate flapper valves spaced from one another in said discharge means.

12. An apparatus as claimed in claim 9 wherein:
said rotary kiln means includes internal lifter means for cascading said scrap through the interior of said rotary kiln means during the rotation of said rotary kiln means.

13. An apparatus as claimed in claim 9 wherein:
said heat supply means includes conduit means for conveying heated gas from said melter means to said inlet conduit means so that heated gas from said melter means is supplied to said gas stream introduced into said kiln means.

14. An apparatus for use in treating metallic scrap which comprises:
rotary kiln means for use in contacting metallic scrap with a hot gas stream flowing through the interior of said rotary kiln means, said rotary kiln means having an inlet end and a discharge end, said hot gas stream flowing through said rotary kiln means from said inlet end to said outlet end,
closure means for isolating said inlet end from the ambient atmosphere,
separator means for isolating said discharge end from the ambient atmosphere and for separating scrap particles discharged from said kiln means from said hot gases passing through said kiln means,
inlet conduit means for introducing said hot gas into said inlet end of said kiln means,
heat supply means external to said rotary kiln means for supplying said hot gas to said inlet conduit means,
temperature control means for controlling the temperature of the hot gas stream at the outlet end of said rotary kiln means substantially constant, said temperature control means including temperature monitoring means at said outlet end of said rotary kiln means, said temperature monitoring means measuring the temperature of the hot gas stream at the outlet end of said rotary kiln means, said temperature control means connected to said heat supply means so as to regulate the quantity of heat in said hot gas stream introduced into said kiln means,
feed means for introducing scrap metal particles into the inlet end of said kiln means,
discharge means for removing metal particles from said separator means,
airlock means for isolating at least one of said inlet or said outlet ends of said rotary kiln means from the ambient atmosphere,
pressure control means for controlling the pressure in said heat supply means,
and including
control means for operating said heat supply means so that additional heated gas is added to said recyled hot gas to maintain the temperature of heated gas passing through said outlet end of said kiln substantially constant.

15. An apparatus as claimed in claim 14 wherein:
said feed means includes a feed chute, and
said airlock means includes two separate flapper valves spaced from one another along the length of said feed chute.

16. An apparatus as claimed in claim 14 wherein:
said pressure control means includes a pressure monitoring means, a damper means, said damper means regulating the flow of hot gases in said heat supply means in response to said pressure monitoring means.

17. An apparatus for use in treating metallic scrap which comprises:
rotary kiln means for use in contacting metallic scrap with a hot gas stream flowing through the interior of said rotary kiln means, said rotary kiln means having an inlet end and a discharge end, said hot gas stream flowing through said rotary kiln means from said inlet end to said outlet end,
closure means for isolating said inlet end from the ambient atmosphere,
separator means for isolating said discharge end from the ambient atmosphere and for separating scrap particles discharged from said kiln means from said hot gases passing through said kiln means,
inlet conduit means for introducing said hot gas into said inlet end of said kiln means,
heat supply means external to said rotary kiln means for supplying said hot gas to said inlet conduit means,
said heat supply means supplying a hot gas which is substantially incapable of supporting a flaming combustion process within said kiln,
temperature control means for controlling the temperature of the hot gas stream at the outlet end of said rotary kiln means substantially constant, said temperature control means including temperature monitoring means at said outlet end of said rotary kiln means, said temperature monitoring means measuring the temperature of the hot gas stream at the outlet end of said rotary kiln means, said temperature control means connected to said heat supply means so as to regulate the quantity of heat in said hot gas stream introduced into said kiln means,
feed means for introducing scrap metal particles into the inlet end of said kiln means,
discharge means for removing metal particles from said separator means,
airlock means for isolating at least one of said inlet or said outlet ends of said rotary kiln means from the ambient temperature,
said rotary kiln means includes internal lifter means for cascading said scrap through the interior of said rotary kiln means during the rotation of said rotary kiln means,
pressure control means for controlling the pressure in said heat supply means, said pressure control means includes a pressure monitoring means, a damper means, said damper means regulating the flow of hot gases in said heat supply means to the ambient atmosphere in response to the pressure monitoring means, said feed means includes a feed chute and said airlock means includes two separate flapper valves spaced from one another along the length of said feed chute,
and including
control means for operating said heat supply means so that additional heated gas is added to said recycled hot gas to maintain the temperature of heated gas passing through said outlet end of said kiln substantially constant.

18. An apparatus for use in treating metallic scrap which comprises:
rotary kiln means for use in contacting metallic scrap with a recycled flame-free hot gas stream consisting essentially of gas which is passed through said kiln and which has been incinerated and diluent air, said rotary kiln means having an inlet and a discharge end, said hot gas stream flowing through said kiln means from said inlet end to said outlet end,
hood means for isolating said inlet end from the ambient atmosphere,
separating means for isolating said discharge end from the ambient atmosphere and for separating scrap particles discharged from said kiln means from hot gas passing through said kiln means,
feed means for introducing scrap metal particles into the inlet end of said kiln means through said hood means,
inlet conduit means for introducing said hot gas stream into said inlet end of said kiln means through said hood means,
discharge means for removing metal particles from said separating means,
heat supply means for supplying said hot gas stream to said inlet conduit means,
said heat supply means consisting essentially of an incinerator, other conduit means for conveying hot gas from said separating means to said incinerator, further conduit means for conveying hot gas from said incinerator to said inlet conduit means and means for supplying diluent air for temperature control purposes,
temperature control means for controlling the temperature of the hot gas stream at the outlet end of said rotary kiln means substantially constant, said temperature control means including temperature monitoring means at said outlet end of said rotary kiln means, said temperature monitoring means measuring the temperature of the hot gas stream at the outlet end of said rotary kiln means, said temperature control means connected to said heat supply means so as to regulate the temperature and flow rate of said hot gas stream introduced into said kiln means,
airlock means for isolating at least one of said inlet or said outlet ends of said rotary kiln means from the ambient atmosphere,
and including
melter means for melting scrap located so as to receive heated metal particles from said discharge means,
burner means for heating said melter means; and
said heat supply means includes conduit means for conveying heated gas from said melter means to said inlet conduit means so that heated gas from said melter means is supplied to said gas stream introduced into said kiln means.

19. An apparatus for use in treating metallic scrap which comprises:
rotary kiln means for use in contacting metallic scrap with a flame-free hot gas stream consisting essentially of gas which is passed through said kiln and which has been incinerated and diluent air flowing through the interior of said rotary kiln means, said rotary kiln means having an inlet end and an outlet end, said hot gas stream flowing through said rotary kiln means from said inlet end to said outlet end,
closure means for isolating said inlet end from the ambient atmosphere,
separator means for isolating said discharge end from the ambient atmosphere and for separating scrap particles discharged from said kiln means,
inlet conduit means for introducing said hot gas stream into said inlet end of said kiln means,
heat supply means external to said rotary kiln means for supplying said hot gas stream to said inlet conduit means,
said heat supply means consisting essentially of an incinerator, other conduit means for conveying hot gas from said separating means to said incinerator, further conduit means for conveying hot gas from said incinerator to said inlet conduit means and means for supplying diluent air for temperature control purposes,
temperature control means for controlling the temperature of the hot gas stream at the outlet end of said rotary kiln means substantially constant, said temperature control means including temperature monitoring means at said outlet end of said rotary kiln means, said temperature monitoring means measuring the temperature of the hot gas stream at the outlet end of said rotary kiln means, said temperature control means connected to said heat supply means so as to regulate the temperature and flow rate in said hot gas stream introduced into said kiln means,
feed means for introducing scrap metal particles into the inlet end of said kiln means,
discharge means for removing metal particles from said separator means,
airlock means for isolating at least one of said inlet or said outlet ends of said rotary kiln means from the ambient atmosphere;
and including,
melter means for melting scrap located so as to receive heated metal particles from said discharge means;
burner means for heating said melter means; and
said heat supply means includes conduit means for conveying heated gas from said melter means to said inlet conduit means so that heated gas from said melter means is supplied to said gas stream introduced into said kiln means.

20. An apparatus for use in treating metallic scrap which comprises:
rotary kiln means for use in contacting metallic scrap with a hot gas stream flowing through the interior of said rotary kiln means, said rotary kiln means having an inlet end and a discharge end, said hot gas stream flowing through said rotary kiln means from said inlet end to said outlet end,
closure means for isolating said inlet end from the ambient atmosphere,
separator means for isolating said discharge end from the ambient atmosphere and for separating scrap particles discharged from said kiln means from said hot gases passing through said kiln means,
inlet conduit means for introducing said hot gas into said inlet end of said kiln means,
heat supply means external to said rotary kiln means for supplying said hot gas to said inlet conduit means, temperature control means for controlling the temperature of the hot gas stream at the outlet end of said rotary kiln means substantially constant, said temperature control means including temperature monitoring means at said outlet end of said rotary kiln means, said temperature monitoring means measuring the temperature of the hot gas stream at the outlet end of said rotary kiln means, said temperature control means connected to said heat supply means so as to regulate the quantity of heat in said hot gas stream introduced into said kiln means, feed means for introducing scrap metal particles into the inlet end of said kiln means, discharge means for removing metal particles from said separator means, airlock means for isolating at least one of said inlet or said outlet ends of said rotary kiln means from the ambient atmosphere, pressure control means for controlling the pressure in said heat supply means, and including melter means for melting scrap located so as to receive heated metal particles from said discharge means, burner means for heating said melter means; and said heat supply means includes conduit means for conveying heated gas from said melter means to said inlet conduit means so that heated gas from said melter means is supplied to said gas stream introduced into said kiln means.

21. An apparatus for use in treating metallic scrap which comprises:

rotary kiln means for use in contacting metallic scrap with a hot gas stream flowing through the interior of said rotary kiln means, said rotary kiln means having an inlet end and a discharge end, said hot gas stream flowing through said rotary kiln means from said inlet end to said outlet end, closure means for isolating said inlet end from the ambient atmosphere, separator means for isolating said discharge end from the ambient atmosphere and for separating scrap particles discharged from said kiln means from said hot gases passing through said kiln means, inlet conduit means for introducing said hot gas into said inlet end of said kiln means, heat supply means external to said rotary kiln means for supplying said hot gas to said inlet conduit means, said heat supply means supplying a hot gas which is substantially incapable of supporting a flaming combustion process within said kiln, temperature control means for controlling the temperature of the hot gas stream at the outlet end of said rotary kiln means substantially constant, said temperature control means including temperature monitoring means at said outlet end of said rotary kiln means, said temperature monitoring means measuring the temperature of the hot gas stream at the outlet end of said rotary kiln means, said temperature control means connected to said heat supply means so as to regulate the quantity of heat in said hot gas stream introduced into said kiln means, feed means for introducing scrap metal particles into the inlet end of said kiln means, discharge means for removing metal particles from said separator means, airlock means for isolating at least one of said inlet or said outlet ends of said rotary kiln means from the ambient temperature, said rotary kiln means includes internal lifter means for cascading said scrap through the interior of said rotary kiln means during the rotation of said rotary kiln means, pressure control means for controlling the pressure in said heat supply means, said pressure control means includes a pressure monitoring means, a damper means, said damper means regulating the flow of hot gases in said heat supply means to the ambient atmosphere in response to the pressure monitoring means, said feed means includes a feed chute and said airlock means includes two separate flapper valves spaced from one another along the length of said feed chute, and including melter means for melting scrap located so as to receive heated metal particles from said discharge means, burner means for heating said melter means; and said heat supply means includes conduit means for conveying heated gas from said melter means to said inlet conduit means so that heated gas from said melter means is supplied to said gas stream introduced into said kiln means.

22. An apparatus for use in treating metallic scrap which comprises:

rotary kiln means for use in contacting metallic scrap with a hot gas stream flowing through the interior of said rotary kiln means, said rotary kiln means having an inlet end and a discharge end, said hot gas stream flowing through said rotary kiln means from said inlet end to said outlet end, closure means for isolating said inlet end from the ambient atmosphere, separator means for isolating said discharge end from the ambient atmosphere and for separating scrap particles discharged from said kiln means from said hot gases passing through said kiln means, inlet conduit means for introducing said hot gas into said inlet end of said kiln means, heat supply means external to said rotary kiln means for supplying said hot gas to said inlet conduit means, temperature control means for controlling the temperature of the hot gas stream at the outlet end of said rotary kiln means substantially constant, said temperature control means including temperature monitoring means at said outlet end of said rotary kiln means, said temperature monitoring means measuring the temperature of the hot gas stream at the outlet end of said rotary kiln means, said temperature control means connected to said heat supply means so as to regulate the quantity of heat in said hot gas stream introduced into said kiln means, feed means for introducing scrap metal particles into the inlet end of said kiln means, discharge means for removing metal particles from said separator means, airlock means for isolating at least one of said inlet or said outlet ends of said rotary kiln means from the ambient atmosphere, and including control means for operating said heat supply means so that additional heated gas is added to said recycled hot gas to maintain the temperature of heated gas passing through said outlet end of said kiln substantially constant.

* * * * *

UNITED STATES PATENT AND TRADEMARK OFFICE
CERTIFICATE OF CORRECTION

PATENT NO. : 4,264,060
DATED : April 28, 1981
INVENTOR(S) : NOEL H. TWYMAN

It is certified that error appears in the above-identified patent and that said Letters Patent are hereby corrected as shown below:

Column 4, line 3, "furance" should read --furnace--.

Column 12, line 4, "present" should read --prevent--.

Column 12, line 24, "in" should read --an--.

Signed and Sealed this

Thirtieth Day of March 1982

[SEAL]

Attest:

Attesting Officer

GERALD J. MOSSINGHOFF

Commissioner of Patents and Trademarks